US005127436A

United States Patent [19]

Campion et al.

[11] Patent Number: 5,127,436

[45] Date of Patent: Jul. 7, 1992

[54] GAS DISTRIBUTION ADAPTER AND PRESSURE REDUCER FOR HIGH PRESSURE GAS CONTAINERS

[75] Inventors: Gérard Campion, Paris; Alain Demeulemeester, Pierrefitte sur Seine; Eric Fortuit, Viroflay, all of France

[73] Assignees: L'Air Liquide, Societe Anonyme pour L'Etude et L'Exploitation des Procedes Georges Claude, Paris, France; L, 3 Etude et 1, 03; Paris FRX

[21] Appl. No.: 727,238

[22] Filed: Jul. 9, 1991

[30] Foreign Application Priority Data

Jul. 17, 1990 [FR] France ................ 90 09089

[51] Int. Cl.[5] ................ F16K 21/00; F16K 17/00

[52] U.S. Cl. ................ 137/614.11; 137/614.19; 137/614.2

[58] Field of Search ................ 137/613, 614.11, 614.12, 137/614, 614.04, 614.19, 614.2, 557, 322

[56] References Cited

U.S. PATENT DOCUMENTS

| | | | |
|---|---|---|---|
| 3,885,589 | 5/1975 | Iung | 137/613 |
| 4,763,690 | 8/1988 | Martin | 137/613 |
| 4,782,861 | 11/1988 | Ross | 137/613 |
| 4,836,247 | 6/1989 | Chuang | 137/613 X |
| 4,898,210 | 2/1990 | Nitta | 137/614.19 |
| 4,960,261 | 10/1990 | Scott et al. | 137/322 X |
| 4,971,224 | 11/1990 | Scremin | 137/322 X |
| 5,018,552 | 5/1991 | Politi et al. | 137/614.11 |

FOREIGN PATENT DOCUMENTS

| | | |
|---|---|---|
| 0033139 | 8/1981 | European Pat. Off. . |
| 0333968 | 9/1989 | European Pat. Off. . |
| 2123892 | 9/1972 | France . |

*Primary Examiner*—Martin P. Schwadron
*Assistant Examiner*—Kevin L. Lee
*Attorney, Agent, or Firm*—Young & Thompson

[57] ABSTRACT

The device comprises an assembly intended to be mounted on a closure valve of a high pressure container and comprises a manual control device operating a distribution valve in which the upstream end communicates with the closure valve, a pressure reducer and a safety device against over pressures between the distribution valve and an outlet for connection to a user circuit, as well as a manometer which measures the pressure upstream of the distribution valve. A pusher-rod operates the valve of the closure valve in response to a movement of the distribution valve.

10 Claims, 1 Drawing Sheet

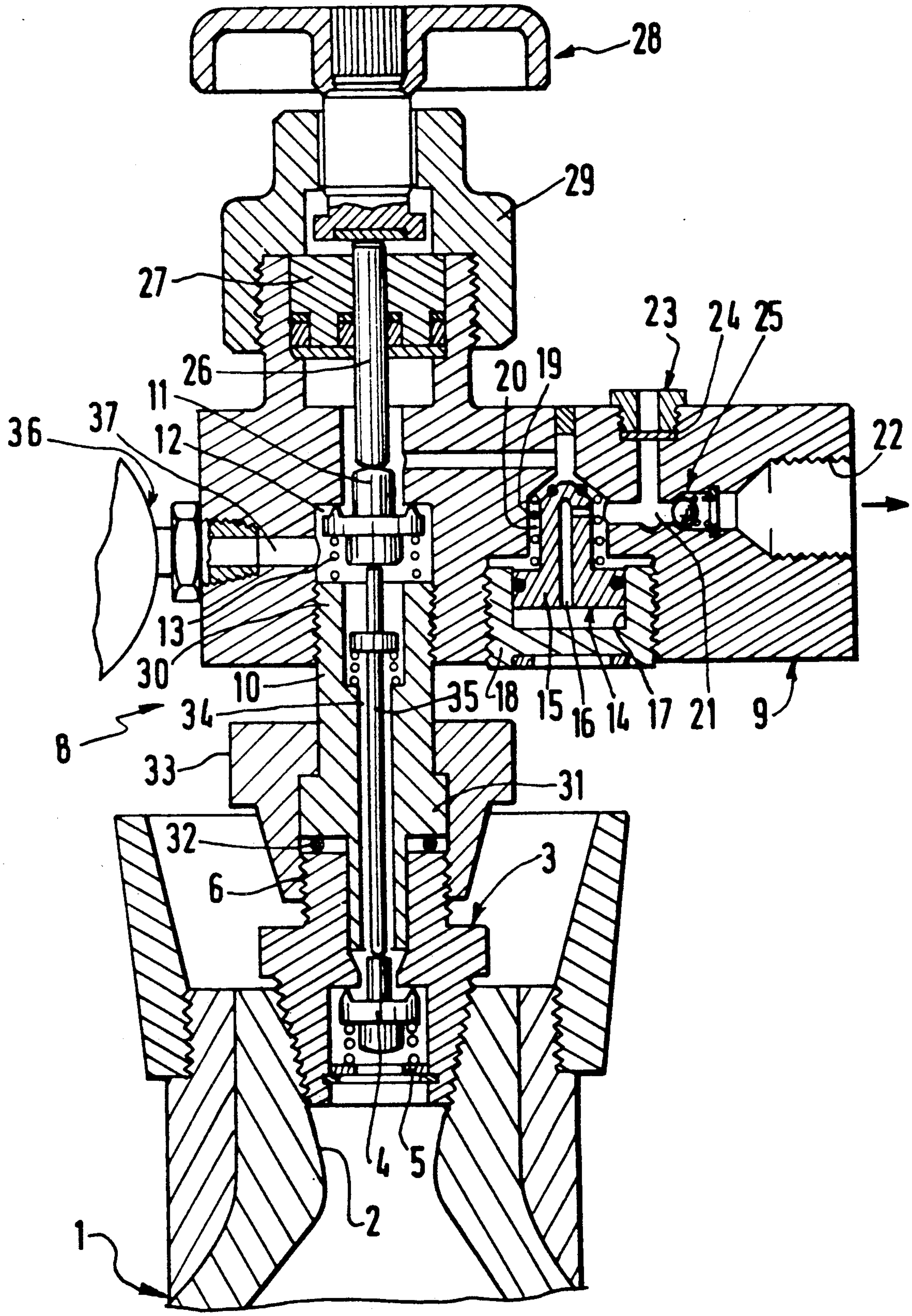
28
29
27
26
23
24
25
20
19
11
37
36
12
22
13
30
10
8
34
35
18
15
16
14
17
21
9
33
31
32
3
6
4
5
2
1

GAS DISTRIBUTION ADAPTER AND PRESSURE REDUCER FOR HIGH PRESSURE GAS CONTAINERS

BACKGROUND OF INVENTION (a) Field of the Invention

The present invention concerns equipments or apparatuses which are supplied with a gas under pressure by means of transportable containers or gas bottles, and, more particularly, it relates to a gas distribution adapter and pressure reducer for high pressure gas container.

(b) Description of Prior Art

In most current applications, the containers or gas bottles contain a gas under a pressure which is lower than $200\times10^5$ Pa, the downstream equipments or installations being designed accordingly. There is presently a need to increase the volumes of available gas or, for a same volume of gas, to decrease the congestion of containers, to supply such containers with a higher gas pressure, which may exceed $300\times10^5$ Pa, all of which being made possible by the technology associated with the containers or bottles. However, as mentioned above, the equipments or installations of the users are not designed for such pressures and it is not conceivable, on a medium term, to redesign these installations or equipments to feeding pressures of the order of 300 bar.

It has been considered to provide the containers or bottles with integrated pressure reducer valves. Such an approach however has the disadvantage of requiring a review of the size of the necks of the containers or bottles, and to substantially increase the exploitation cost since the transportable pieces (containers or bottles with their pressure reducer valves) become substantially more costly.

SUMMARY OF INVENTION

It is an object of the present invention to propose a gas distribution adapter and pressure reducer for high pressure container enabling to provide containers with a standard size and enabling the user to preserve his existing material, which can be used in all safety, with a minimum excess cost, the distribution adapter and pressure reducer device remaining permanently with the user.

For this purpose, according to a characteristic of the invention, the device comprises an assembly which can be connected to the closure valve of the gas container and includes a manual control device adapted so as to operate a distribution valve, an outlet connection to a user circuit, and a pressure reducer disposed between the distribution valve and the outlet connection.

With such an arrangement, the pressure reducer is calibrated to produce a reduced pressure (of the order of 180 to $200\times10^5$ Pa) which is compatible with the material of the user, and the latter may, very simply and in all safety, use his material either with medium pressure containers or, through the device according to the invention, with high pressure containers.

According to a more specific characteristic of the invention, the device comprises a manometer which measures the pressure in the container, thus enabling the user to know, at the time of delivery or at any other time, the true pressure of the gas in the container.

BRIEF DESCRIPTION OF THE DRAWINGS

Other characteristics and avantages of the present invention will appear from the description which follows of an embodiment given by way of illustration and without limitation, with reference to the annexed drawing, wherein:

the single FIGURE is a schematic representation in longitudinal cross-section of a distribution adapter and pressure reducer device mounted on a high pressure gas container.

DESCRIPTION OF PREFERRED EMBODIMENT

On the single figure, one will recognize the upper portion of a gas bottle 1 in which the neck comprises a conical threaded opening 2 on which there is mounted a closure valve body 3 defining a seat for a closure valve 4 which is acted upon in the direction of closure, towards the outside by means of a spring 5 which may supplement the pressure in bottle 1. This valve body 3, which is normally closed by means of a plug screwed on an outer thread 6 of the body 3 is protected by means of a peripheral cap 7.

The device according to the invention comprises an assembly 8 intended to be mounted on the valve body 3 and consists of a main body 9 and a mounting support 10. The body 9 comprises a distribution valve 11 disposed in a housing 12 of the body and is urged into closure by means of a spring 13. Downstream of the distribution valve 11, there is a pressure reducer 14 of the differential piston type 15 provided with a centrally extending duct 16 and sealingly sliding in a bore 17 advantageously made of an element 18 screwed in the body 9, a spring 19 urging the piston 15 towards the rear control chamber of the piston. The intermediate chamber 20 of the pressure reducer communicates, by means of a medium pressure channel 21, with an outlet 22 for connecting block 9 to a user circuit, the outlet, in the example illustrated, being advantageously of the female type to prevent a user from being tempted to connect the user circuit directly on the thread 6 of the valve body 3.

To ensure an increased safety for the user, the block 9 additionally comprises a safety device 23 against high pressures, advantageously of the breaking disk type 24, which is exposed to the supply pressure which prevails in the duct 21. Optionally to prevent a possible gas return in the device, a check-valve 25 is provided between duct 21 and the outlet 22.

In the embodiment which is illustrated, the distribution valve 11 is operated, via a pusher member 26 which slides through a packing box 27 mounted in body 9, by means of a spindle 28 screwed in a valve head 29 which itself is mounted on the body 9. In this embodiment, the housing 12 of the distribution valve 11 consists of a bore in which there is fixedly mounted an end 30 of the support 10, which is of tubular configuration. The other end 31 is engaged in the valve body 3 and is kept in place by disposing therebetween a seal 32 by means of a nut 33 screwed on the valve body. The support 10 includes a stepped longitudinal bore 34 in which a pusher-rod 35 is interposed to define a spacer between the valves 4 and 11, coaxially thereto so that the opening of the valve 11 by means of spindle 28, via pusher member 26, produces a simultaneous opening of the closure valve 4, thereby pressurising under the high pressure of bottle 1, the bore 34 and chamber 12 of valve 11.

According to a particular aspect of the invention, a manometer 36, advantageously of the Bourdon type, graduated from 0 to $600 \times 10^5$ Pa, is mounted on body 9 and communicates, via duct 37, with bore 12, thereby giving a permanent indication about the gas pressure in bottle 1.

Although the present invention has been described with respect to an embodiment, it is not limited thereby but, on the contrary, it is susceptible to modifications and variants which will appear to one skilled in the art. In particular, the arrangement of the elements disposed in or on the block 9 may be modified at will. The spindle 28 may thus be laterally mounted to operate, for example, a distribution valve 11, of the rocking type to produce a depression of the pusher-rod 35. As a variant, the pusher-rod 35 may be operated by means of a manual control member independently of the control spindle of the distribution valve 11.

We claim:

1. Gas distribution adapter and pressure reducer device for high pressure container including a closure valve, wherein said device comprises an assembly connectable to the closure valve and including:

manual control means arranged to operate a distribution valve;

an outlet for connection to a user circuit; and a pressure reducer disposed between the distribution valve and the connection outlet, said assembly including a body containing the distribution valve and a pressure reducer, and a mounting support for mounting on the closure valve, said support having a duct communicating with the distribution valve and containing a pusher-rod which, in mounting position, cooperate with the valve of the closure valve.

2. Device according to claim 1, wherein the mounting support comprises a first end for engagement with the closure valve of the container and a second end mounted in a recess of the body communicating with the downstream end of the closure valve.

3. Device according to claim 1, wherein the manual control means include a spindle whose rotation produces a translation movement of a pusher member which is operatively connected with the distribution valve.

4. Device according to claim 3, wherein the pusher member is disposed between the closure valve and the distribution valve.

5. Device according to claim 4, wherein the pressure reducer is of the differential type.

6. Device according to claim 1, wherein the body comprises a safety device against over-pressures, said safety device being disposed between the pressure reducer and the connection outlet.

7. Device according to claim 1, further including a manometer mounted on the body and communicating with the upstream end of the distribution valve.

8. Device according to claim 1, further including which a check valve at the upstream end of the connection outlet.

9. A gas dispenser apparatus for use with a high pressure gas cylinder having a closure valve body enclosing a spring-biased closure valve member, comprising a valve assembly connectable to the closure valve body and forming internally a gas discharge circuit downstream of the closure valve member, the valve assembly including, serially arranged in the gas discharge circuit, a distribution valve member and a pressure reducer, coupling means between the distribution valve member and the closure valve member, and manual operating means for manual operation of the distribution valve member and of the closure valve member.

10. The apparatus of claim 9, further comprising a manometer in communication with the gas discharge circuit, upstream of the distribution valve member.

* * * * *